March 7, 1939.    G. A. UNGAR    2,149,822
CUTTING MACHINE
Filed Oct. 21, 1935    5 Sheets-Sheet 1

INVENTOR.
Gustave A. Ungar
BY
Samuel Ostrolenk
ATTORNEY.

March 7, 1939.  G. A. UNGAR  2,149,822
CUTTING MACHINE
Filed Oct. 21, 1935   5 Sheets-Sheet 4

Fig. 11
Fig. 12

INVENTOR.
Gustave A. Ungar
BY
ATTORNEY.

March 7, 1939.　　　　　G. A. UNGAR　　　　　2,149,822

CUTTING MACHINE

Filed Oct. 21, 1935　　　　5 Sheets-Sheet 5

TORQUE DIAGRAM FOR MAXIMUM CUT-OFF LENGTH

INVENTOR.
Gustave A. Ungar
BY
Samuel Ostrolenk
ATTORNEY.

Patented Mar. 7, 1939

2,149,822

UNITED STATES PATENT OFFICE 2,149,822

CUTTING MACHINE

Gustave A. Ungar, Pelham Manor, N. Y., assignor to S. & S. Corrugated Paper Machinery Co., Inc., Brooklyn, N. Y., a corporation of New York Application October 21, 1935, Serial No. 45,858

22 Claims. (Cl. 164—68)

My invention relates to novel cutting apparatus, and, more particularly, relates to novel apparatus for and methods of cutting wire and sheet material such as sheet metal, paper, corrugated boards, etc.

The sheet material or wire which is to be cut is usually fed at a fixed and constant speed to the cutting apparatus and the cutting apparatus is operated to periodically engage and cut the material. During the cutting period, and while the knives are engaging the material, the knives naturally must be moving in the same direction and in synchronous speed with the material.

While the period of one particular cycle for cutting predetermined lengths of material may be such that the knives are moving in synchronism with the material during cutting, a problem is created when the length of material being cut is changed to a new size. For obtaining the new size, the period of the knife cycle between cuts is changed to permit more or less material to pass the knives between each cutting operation. In changing this period of the knife cycle, the rate of speed of the knife at the instant of cutting also changes, so that the knife is no longer in synchronism with the material during cutting.

Heretofore, it has been proposed to provide such synchronism for all sizes of cuts by employing in the transmission system which controls the period of the knife cycle, a complex set of elliptical gears and cams so arranged that when the drive speed is changed for changing the period of the knife cycle, a compensating adjustment may also be made in the elliptical gears and cams so that at the instant of cutting, the knives are in synchronism with the movement of the strip material. Besides being costly in that this involved expensive elliptical gears, it also is complicated and not entirely accurate due to the fact that when elliptical gears are used, a certain amount of error in synchronism inevitably creeps in because of the continuous change in speed at every instant which is a characteristic of elliptical gears. This is particularly true in such systems due to the adjustments of the elliptical gears necessary for each size of cut. Although the elliptical gears may be satisfactory when in a predetermined adjustment, they are not so for a new adjustment or relative position thereof with respect to the knives.

To overcome these difficulties, a radical departure has been proposed in which separate drives for the knives are employed, one for predetermining the period of the cycle of the knives and which is effective for driving the knives during the non-cutting period and the other for driving the knives during the cutting period at a fixed, predetermined speed which is in synchronism with the strip material.

In accordance with my present invention, I propose an entirely new principle of operation in which, instead of complicated elliptical gears, I employ a transmission system which inherently provides the necessary changes in speed within the cycle. In place of the above described complex elliptical gear transmission system, I employ a standard transmission such as the ordinary circular gears or a hydraulic transmission or any other type of commonly known transmission. I control this transmission system by an external controlling device which at all times during a cycle acts upon the transmission system for invariably bringing the speed of the knives to synchronous speed during cutting. By this entirely new principle of operation, not only do I eliminate complicated transmission mechanism, replacing it by simple standard apparatus, but I avoid the difficulties and inaccuracies experienced by such systems in that I require only a single control which follows the common practice of the prior art which merely changes the period of the cycle for different sized cuts desired, the external timing or control mechanism thereafter functioning automatically to obtain the desired synchronous speed during cutting.

Four types of such control mechanism are shown for modifying the speed of the cutting mechanism to produce the different cut-off lengths of the material.

Accordingly, an object of my invention is to provide a novel cutting mechanism for sheet material.

Still another object of my invention is to provide a novel cutting mechanism for predetermined lengths of material.

A further object of my invention is to provide a novel cutting mechanism in which the knives are always in cutting engagement at the same speed with which sheet material is fed through the machine.

Another object of my invention is to provide a control extending from and independent of the transmission system for controlling the speed of the cutting mechanism during the cutting period.

Still a further object of my invention is to provide novel apparatus whereby the cut-off length can be readily and quickly modified through selective control at each instant in a cycle of a drive connection from a source of power to the cutting mechanism and without the necessity of clutches or couplings, since the cutting mechanism is always positively driven.

Still another object of my invention is to readily compensate for slight differences between the speed of the material and the speed of the knives at the instant of cutting which may occur owing to a slight slipping of the material between the feed rolls.

Still another object of my invention is to store up the energy of revolving cutting elements when their speed decreases so as to have it available for their acceleration during the other half of the cycle; this eliminates the necessity of braking means which are otherwise required and which occasion not only unnecessary power loss but also excessive stresses on the driving mechanism.

There are other objects of my invention which, together with the foregoing will appear in the detailed description of the invention which is to follow in connection with the drawings, in which:

Figure 13 is a view of the mechanism illustrated in Figure 11 looking in the direction of arrow 13, while Figure 14 is a view of the same mechanism looking in the direction of arrow 14.

Figures 1, 2:
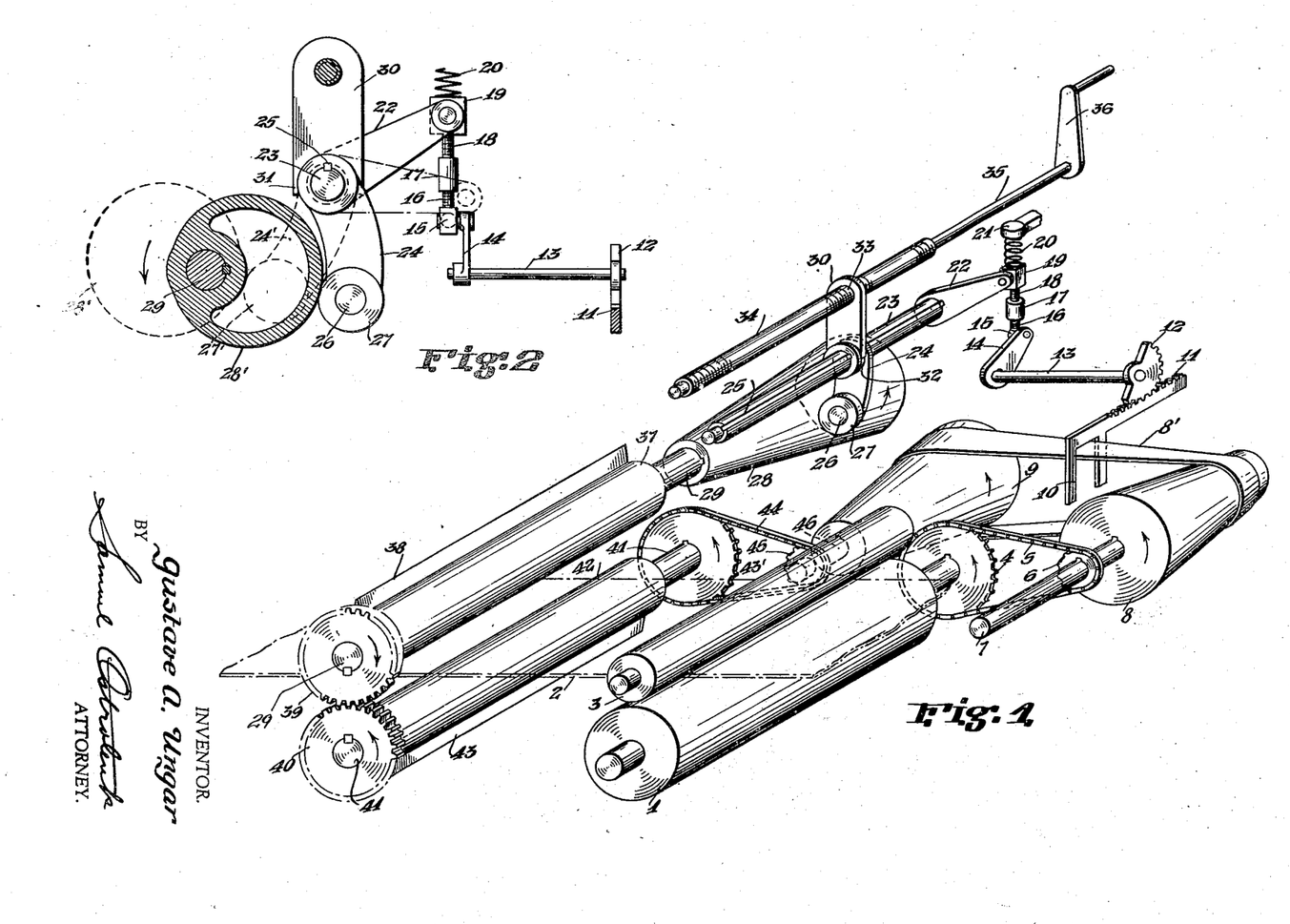
Figure 1 is a perspective schematic illustration of one form of my invention.
Figure 2 is a fragmentary side elevation of the speed varying mechanism and transverse section through the master cam employed in Figure 1.
Figures 6, 7, 8, 9, 10:
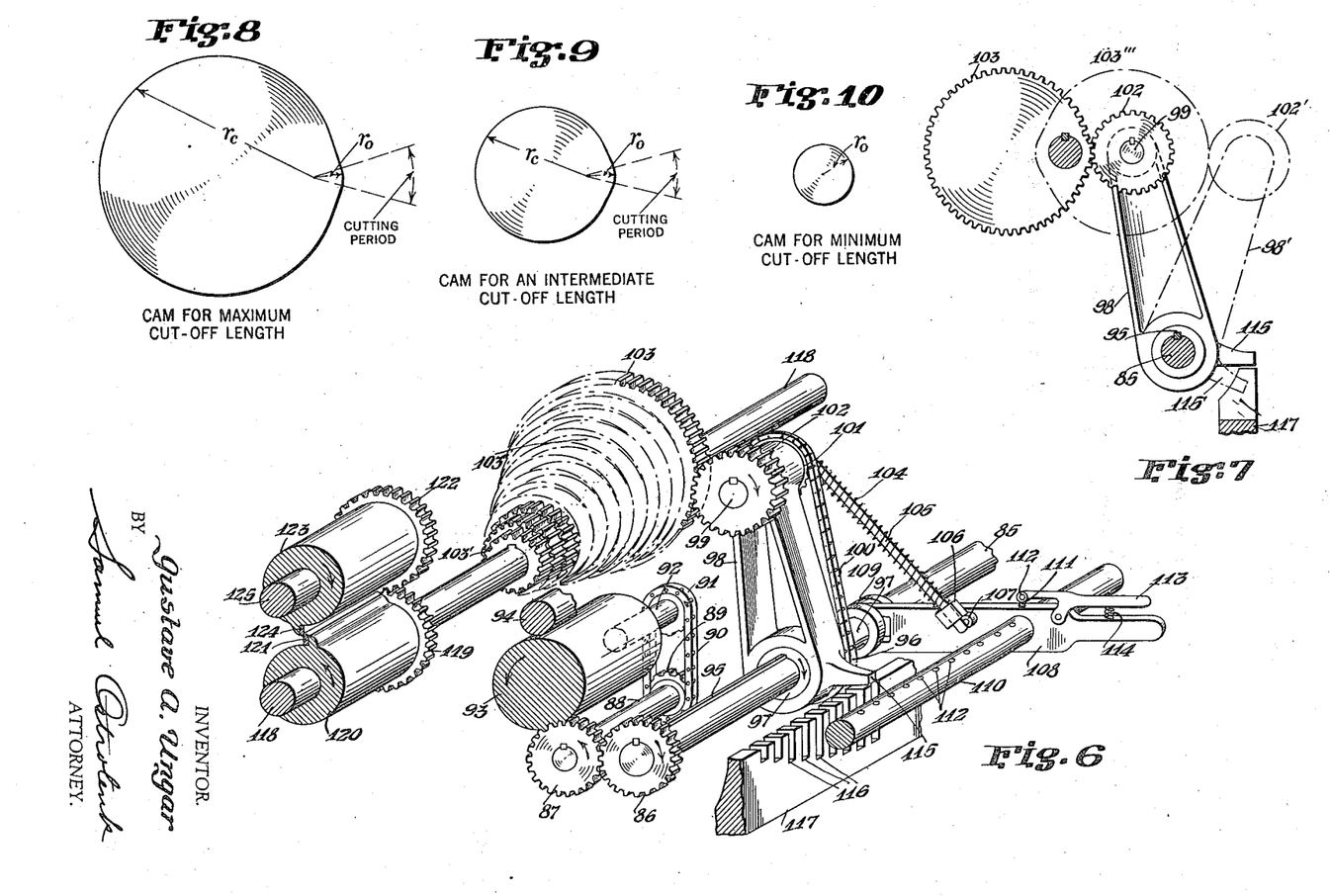
Figure 6 is a perspective schematic illustration of a further form of my invention.
Figure 7 is a fragmentary side elevation of the speed varying mechanism shown in Figure 6.
Figures 8, 9 and 10 are graphic illustrations of the master cam profiles for the longest, an intermediate and the shortest cut-off length.

Referring to Figure 1, the feeding roll 1, which feeds the sheet 2 in cooperation with spring or weight loaded press roll 3, is operated at constant speed by means of sprocket 4, chain 5, and sprocket 6, which is keyed to main drive shaft 7. Shaft 7 is driven from a suitable source of power. Main drive shaft 7 also operates a variable speed transmission, such as a Reeves V belt drive. This variable speed transmission is diagrammatically illustrated as consisting of cone pulley 8, keyed to shaft 7 which drives a secondary cone pulley 9 by means of belt 8', which can be shifted axially with belt shifter fork 10. The axial shifting is done through rack 11 and the pinion sector 12, keyed to shaft 13 and through lever 14. Lever 14 is actuated by means of ball joint 15 and turnbuckle 16, 17, 18 from lever 22. This lever 22 is pressed downward by the action of spring 20, located between the stationary abutment 21 and the pad 19. The upward movement of lever 22 which is keyed to shaft 23 is derived from the movement of lever 24, which is slidably mounted on shaft 23 and is driven by means of key 25. Lever 24 carries pin 26 upon which revolves roller 27. Through the action of spring 20, roller 27 is kept in contact with cam drum 28. The cam profiles of drum 28 vary with their axial location on shaft 29 to which drum 28 is keyed. One of the infinite number of cam profiles is shown in Figure 2 as 28'. The profile of the largest, an intermediate and the shortest cam are also shown in Figures 8, 9 and 10, respectively. The axial location of lever 24 determines the cam profile, which is to actuate this lever. The axial shifting of lever 24 to another cam profile is accomplished by means of link 30, which at its lower forked end 31 engages with groove 32 of lever 24 and at its upper end has a threaded hole 33 with which screw 34 engages. Screw 34 has an extension 35 with a crank 36. By turning crank 36 in either direction, link 30 and with it lever 24, is shifted axially either backward or forward bringing roller 27 into engagement with any desired cam profile 28'.

A revolving knife carrier 37 to which is attached a suitable knife or cutter 38 and timing gear 39 is also keyed to shaft 29. This is in meshing engagement with timing gear 40 which is keyed to lower knife shaft 41 which has attached to it knife carrier 42 with its knife 43. Shaft 41 is driven from output shaft 46 of the variable speed transmission by means of sprocket 45, chain 44 and sprocket 43'.

Knife shafts 37 and 41 are driven at continually varying velocities, which, at each angular position of the knives, are derived from a corresponding position of the cam profile 28' with which roller 27 and lever 24 are cooperating.

The position of cam profile 28', shown in full lines in Figure 2, corresponds to the knife position shown in Figure 1. At this point of the cycle, the knife carriers 37 and 43 have the lowest angular velocity for the sheet length in question, while in the dotted position (cam profile 28''), the knife carriers 37 and 43 move at maximum angular velocity, with knives 38 and 43 in cutting engagement at a speed equal to the constant speed of sheet 2. This speed variation is produced by the back and forward shift of belt 8' by means of fork 10, which in turn is oscillated by the movement of lever 24.

The momentary contact radii of cam 28 with roller 27 are inversely proportional to the variable speed of shaft 46, since the variable speed of this type of transmission varies in linear proportion with the axial location of the belt shifting mechanism.

It will be seen from the following that the cam drum 28, when driven at constant surface velocity, will complete one revolution in a time directly proportional to mean radius of cam profile 28' and any desired length of sheet can be cut off and accurately duplicated, as long as lever 24 remains in the same axial position relative to the cam drum 28. The various cam profiles, some of which are shown in Figures 8, 9 and 10 all have a cam portion consisting of a circular segment with the same radius $r_0$ extending over the same angular distance. As long as roller 27 is in contact with this cam portion $r_0$, lever 24 produces the maximum output speed of the variable speed transmission and the knives 38 and 43, which are then in cutting engagement, are always moving at the same velocity as the sheet while in cutting engagement, regardless of which cam profile actuates lever 24.

Assuming L to be the desired cut-off length of the sheet, $v$ the velocity with which the sheet is fed into the apparatus and $T$ the time which elapses between consecutive cut-offs, then we can write $L=vT$.

Assuming $v$ to be constant, an increase or decrease of $T$ produces a proportionate increase or decrease of $L$.

By changing the revolutions per minute of the knife shaft, $T$ can be varied. If this change would take place with constant angular velocity during the entire knife cycle, then the material and the knives would not move at the same speed while the cut takes place, and the material would therefore tear or buckle. The knife shaft velocity must therefore be varied so that it is equal to that of the sheet while the cut is made.

Now if the angular displacement or travel of the knife shaft and therefore of the cam drum is represented in radians by $\theta$, the variable cam drum radius by $r$, and the time by $t$, the variable angular velocity $w$ of the cam in radians per second can be written as $$w = \frac{d\theta}{dt}$$

With the cam driven at constant circumferential velocity and therefore operating at a variable angular velocity, $w$ which is inversely proportional to the contact radius $r$ of the cam from which the variable speed transmission is controlled, we can write:

$rw=k$ where $k$ is a constant depending upon the input velocity of the variable speed transmission and the gear ratio between the output shaft of the variable speed transmission and the knife shaft.

Therefore $$dt = \frac{d\theta}{w} = \frac{1}{k} r d\theta$$

The time $T$ for one complete revolution of the cam and therefore the knife shaft can be expressed by $$T = \int_0^{2\pi} \frac{d\theta}{w}$$

Since the cut-off length $L$ is proportional to $T$, we can write $$L = KT = \frac{K}{k} \int_0^{2\pi} r d\theta$$

The integral $$\int_0^{2\pi} r d\theta$$

represents the circumference of a circle of the mean cam radius over its entire angular displacement of 360°.

It is therefore only necessary to shift lever 24 axially to any desired cam profile, in order to obtain a cut-off length of the sheet, which is directly proportional to the mean radius of the cam in question.

To obtain a speed of the knives during the period of cutting, equal to that of the sheet $v$, it is now only necessary to select a cam radius $r_o$ which through its action upon the variable speed transmission produces at that moment the desired knife speed $v$. The remaining radii $r_c$ of the cams can then be chosen with due regard to obtaining the most satisfactory acceleration and deceleration conditions for the revolving knife shafts 37 and 41, so long as the mean cam radius producing the desired cut-off length remains unchanged.

The operation of the knife shafts is, therefore, continuous and they are always driven positively at the most favorable velocities, and it is possible to produce with the machine in motion, any desired length of cut-off between a minimum and a maximum length, by merely shifting the axial location of lever 24 and without the necessity of any clutches, brakes, elliptic gears, etc.

In order to correct any slight speed differences between the sheet and the knives when they are cutting owing to possible shifting of the sheet between the feeding rolls 1 and 3, the relative positions of lever 24 and belt shifter fork 10 can be readily changed. This is done by means of turnbuckle 16, 17, 18 which shortens or lengthens the linkage between levers 14 and 22.

If the knives move too fast at the cutting instant, shifter fork 10 is moved to the right and consequently the output speed of drum 9 is reduced during the entire cutting cycle, until sheet and knife speeds are equal at cutting. The cut-off length has been slightly increased and to keep the cut-off length the same as before, it is only necessary to shift lever 24 to the left until the correct length is again cut-off by operating handle 36. This, of course, does not change the knife velocity during the cut-off period since all cams have the same radius $r_o$ for the cut-off.

Figures 3, 4, 5:
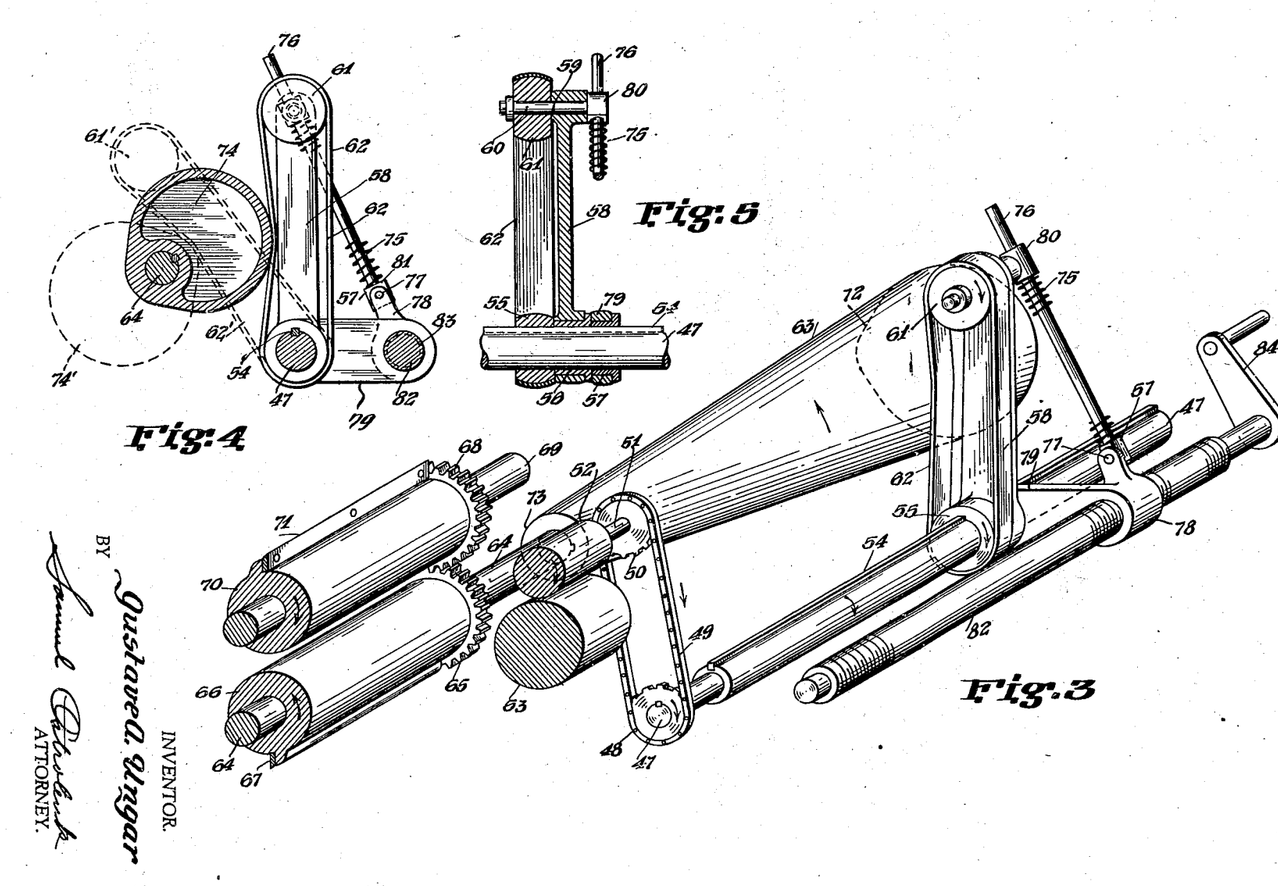
Figure 3 is a perspective schematic illustration of another form of my invention.
Figure 4 is a fragmentary side elevation and Figure 5 is a fragmentary longitudinal section of the speed varying mechanism shown in Figure 3.

Another embodiment of my invention is shown in a perspective schematic view in Figure 3.

The principal difference from the first modification consists in the elimination of the separate variable speed transmission by utilizing the cam drum as a frictional variable speed drive.

Main drive shaft 47, which operates at constant speed, has keyed to it sprocket 48. Through chain 49 it drives sprocket 50, keyed to feed roll shaft 51, which carries feed roll 52 and feeds the material at constant speed through the cooperation with spring loaded press roll 53.

Main drive shaft 47 has extending over its entire length a key 54, which drives the crown pulley 55 slidably mounted upon shaft 47. (See also Figures 4 and 5.) Crown pulley 55 has a hub extension with two ring grooves 56 and 57. Groove 56 provides the bearing for swing arm 58, which at its upper end carries stud 59. The extension 60 of stud 59 forms the bearing for idler crown pulley 61, which is driven at constant speed by belt 62 from pulley 55.

Belt 62 is pressed against the periphery of cam drum 63, which is therefore made to revolve at constant peripheral speed, since the belt speed is constant.

The cam drum 63 is keyed to shaft 64, which also carries timing gear 65 and the lower knife carrier 66 with knife 67. Timing gear 65 is in mesh with timing gear 68, keyed to upper knife shaft 69 which operates knife carrier 70 with its knife 71.

The consecutive profiles of cam drum 63 correspond to those shown in Figures 8, 9 and 10, profile 72 corresponding to that of Figure 8, profile 73 to that of Figure 10, while profile 74 (Fig. 4), which represents the intermediate cam with which belt 62 is shown in contact with Figure 3 corresponds to that of Figure 9.

The mean radii of the various cams are again proportional to the cut-off lengths of the material, since the angular velocities at each point of the cam in contact with belt 62 are inversely proportional to the contact radius of the cam.

In the position of cam 63 shown in Figure 3, and in full lines as 74 in Figure 4, the knives are at their slowest angular velocity. With the cam in Figure 4, in dotted position 74' and belt and pulley (in dotted lines) in positions 62' and 61' respectively, the knife shaft 64 is driven at maximum velocity, corresponding to the sheet velocity, since the knives 67 and 71 are then in cutting engagement.

Belt 62 is kept in continuous frictional contact with cam drum 63 through the action of compression spring 75, which is coiled around guide rod 76. This guide rod 76 has as its lower end fulcrum pin 77, which is mounted in shifter 78. Shifter 78 has an extension 79 which forms a bearing for groove 57 of crown pulley 55. At its upper end guide rod 76 slides in extension 80 of stud 59. Extension 80 also forms the upper abutment for spring 75 while at its lower end it bears against shoulder 81 which carries pin 77.

Shifter 78 can be moved axially along the entire length of cam drum 63 through the action of screw 82, which engages with screw threads 83 of shifter 78 by turning crank 84.

Belt 62 together with swing arm 58 is moved outward, thereby compressing spring 75 as the cam radius increases with decreasing angular cam velocity and it is kept in contact with the cam as the cam radius decreases because of the action of spring 75.

The sheet cut-off length can therefore be varied at will, between desired limits, while the machine is in motion and is accurately maintained by merely shifting the belt 62 axially and without any other speed changing and without drive engaging and disengaging mechanism, since the knife shafts are always driven at the required velocity by the frictional engagement between belt and cam drum.

A third embodiment of my invention is shown as perspective schematic view in Figure 6.

This alternative differs from the previous one by having gears of various diameters in engagement with a constant speed drive gear substituted for the cam drum profiles which are in frictional engagement with the constant speed belt.

Main drive shaft 85 drives at constant speed, through gears 86, 87 and shaft 88, sprocket 89, chain 90 and sprocket 91, the feeding roll shaft 92, which has keyed onto it lower feeding roll 93. The material is fed at constant speed through the cooperation between roll 93 and spring or weight loaded feeding roll 94.

Main drive shaft 85 has an extended key 95 which drives, slidably mounted upon shaft 85, the sprocket 96 with its hub extensions 97 and 97'. The outside of hub 97 forms a bearing for rocker arm 98 which at its upper end carries journaled with it, shaft 99. This shaft is driven from sprocket 96 by means of chain 100 which drives sprocket 101 keyed to shaft 99. Gear 102 is also keyed to shaft 99 and it drives with constant pitch line velocity any of the gears 103 with which it may be in engagement.

The mean pitch radius of each gear 103 is proportional to a definite cut-off length of the sheet. The profiles of the pitch lines correspond to the cam profiles of the two previous embodiments of my invention. Since the angular velocities of the gears 103 vary in inverse ratio with the contact radii of gears 103, the cut-off length produced by each gear is proportional to the mean pitch radius of each gear. The longest cut-off is produced with drive gear 102 in mesh with 103. Its pitchline profile is the same as cam profile Figure 8. The shortest cut-off is produced when 102 meshes with gear 103', the pitchline profile of which corresponds to cam profile Figure 10.

The pitchline profile of an intermediate gear 103'' corresponds to cam profile Figure 10.

In order to maintain the gears in mesh, rocker arm 98 oscillates back and forward and tooth contact is maintained by the action of compression spring 104 which is guided by bar 105. The upper end of bar 105 is pivoted on shaft 99 while its lower end is slidably mounted in guide 106, which is pivoted on pin 107. Pin 107 is mounted in shifter fork 108 which engages with groove 109 on the hub 97' of sprocket 96.

Shifter fork 108 is slideably mounted on bar 110. Each meshing position of gear 102 with the different gears 103 is definitely secured by lock pin 111 mounted slideable in a hole in shifter fork 108, dropping into engagement with one of the holes 112 in bar 110. Lock pin 111 is journaled at 112 in hand-lever 113. By pushing lever 113 downward and thereby compressing spring 114, lockpin 111 is lifted out of engagement with one of the holes 112 and shifter fork 108 can now be moved axially until lockpin 111 drops into another hole 112.

In order to make it impossible to attempt any shifting of drive gear 102 axially, unless it is in mesh with that portion of all cam gears 103, 103' and 103'' which is represented by the equal radius $r_0$ in Figures 8, 9 and 10, rocker arm 98 is provided with a projection 115. This projection 115 engages with one of the slots 116 of register bar 117 where the rocker arm 98 is not in the position which produces meshing of gear 102 with the cam gear portion having the radius $r_0$. Rocker arm 98 can then not be shifted axially which prevents any possible damage to the gear teeth owing to clashing or loss of tooth engagement. The dotted position in Figure 7 indicated by 103''', 102', 98' and 115' show the mechanism at the moment of lowest angular velocity of the driven gears 103. In this position no gear shifting is possible.

With rocker arm 98 in the full line position shown in Figure 7, gear 102 can readily be shifted axially, since the teeth of all profile sections with radius $r_0$ are now perfectly in line.

Gears 103 are keyed to lower knife shaft 118 which carries timing gear 119 and knife carrier 120 with knife 121. Upper knife shaft 125 with knife carrier 123 and knife 124 is driven from gear 119 by means of gear 122.

It will be seen from the foregoing that a predetermined number of different cut-off lengths can be produced with this alternative. The driving of the knife shafts is positive at all times and no clutches or variable speed mechanisms are required. The change from one cut-off length to another can be made with the apparatus in operation or when standing still. In the latter case it is only necessary to revolve the knife shafts until drive gear 102 meshes with the minimum radius sector $r_0$ of the cam gears.

A fourth and preferred embodiment is shown in Figures 11, 12, 13 and 14.

Figures 11, 12:
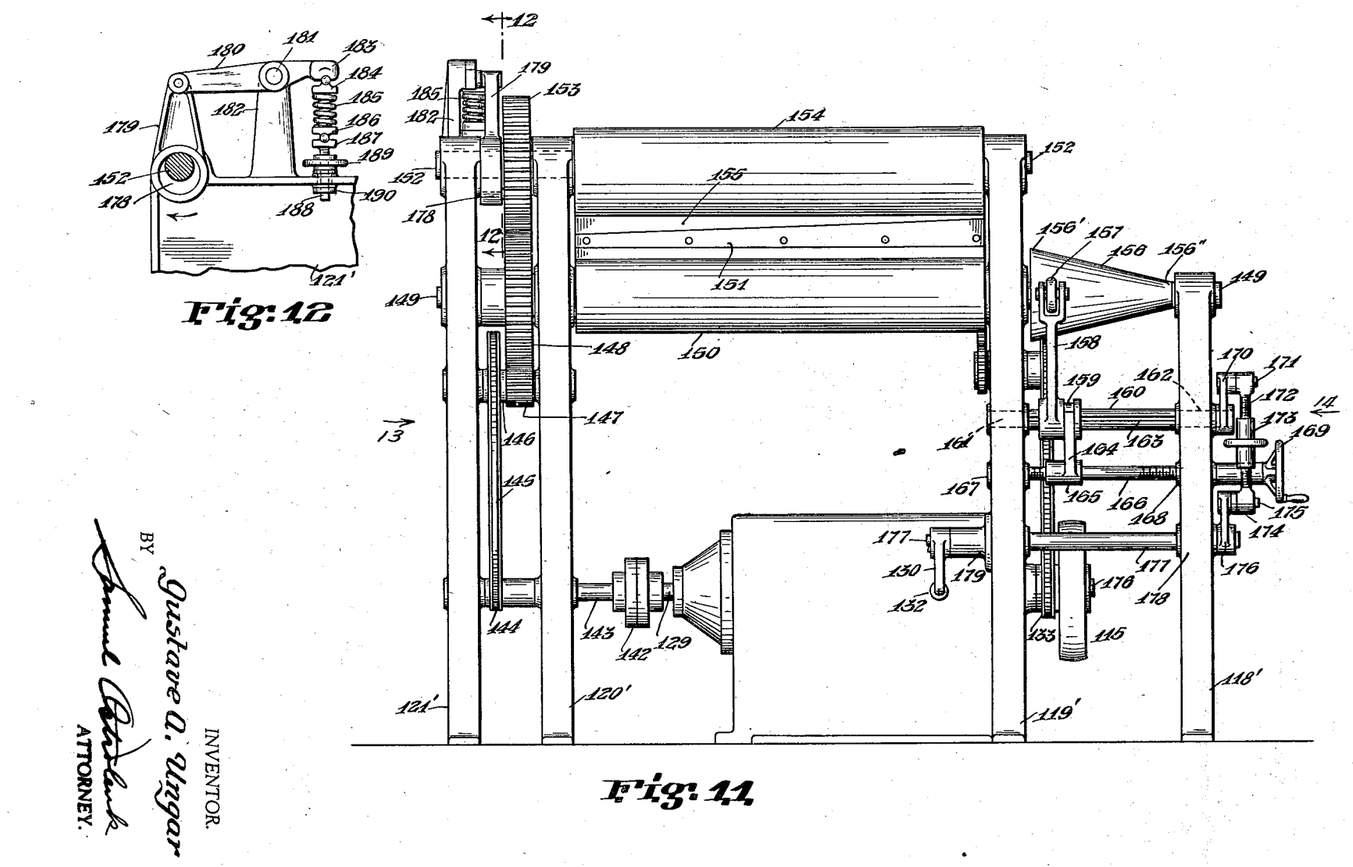
Figure 11 is a transverse elevation of still another form of my invention.
Figure 12 is a fragmentary section along line 12—12 in Figure 11.

The whole mechanism is here mounted in frame members 118', 119', 120', 121'. The power source is shown to be an electric motor 122', which operates at certain constant rates of speed to produce certain definite constant feeding velocities of the sheet material, directly proportional to the motor speed.

Motor 122' drives through pulley 123' and belt 124', the pulley 125 which is keyed to the input shaft 126 of a variable speed hydraulic pump-motor unit 127. This unit may be any of the standard types such as a hydraulic transmission, described in the Journal of the American Society of Naval Engineers, volume 44; (XLIV); 1932 pp. 25–27. These consist of a multiple cylinder oil pump of variable displacement driven at constant speed from a power source, such as 122', and which delivers the oil to a multiple cylinder hydraulic motor, thereby driving it at a variable speed proportional to the variable displacement of the oil pump. The variation of the pump displacement is accomplished by changing the piston stroke through a suitable mechanism.

Such a mechanism consists for instance with the "Oilgear" of a stubshaft attached to a cross slide for shifting the relative location of the crankshaft to the cylinder block, with the cylinders in star formation. By changing the relative crankshaft location the stroke of the pump cylinders and with it the output of the pump is changed.

Figures 13, 14:
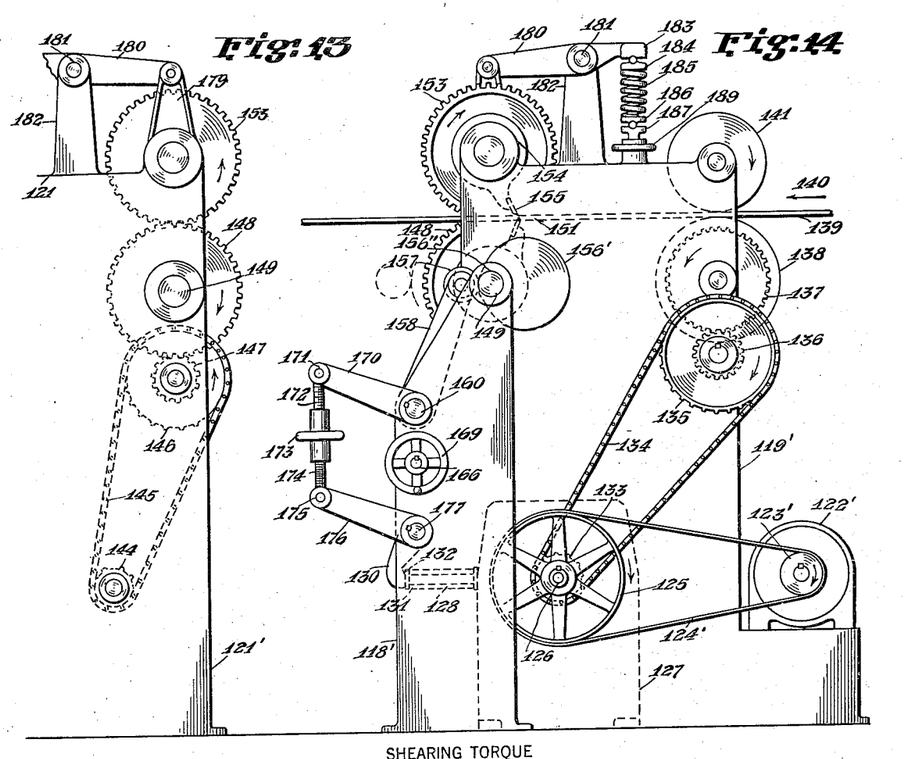

In Figure 14, the stubshaft for changing the pump stroke is indicated by 128. In the position shown, the pump has its maximum stroke and therefore maximum output producing maximum speed of the hydraulic motor and with it its shaft extension 129. The pump volume and therefore the output speed of the variable speed transmission varies in direct proportion with the movement of stub shaft 128. The output speed of the transmission is reduced if 28 is pressed to the right by the action of lever 130. A spring 131 is provided against collar 132 of stubshaft 128, so as to always keep lever 130 and stubshaft 128 in contact regardless of the rapidity of oscillation of lever 130.

Keyed to the constant speed input shaft 126 of variable speed unit 127 is sprocket 133, which drives lower feeding roll 138 through chain 134, sprocket 135 and gears 136 and 137. The sheet 139 is fed into the machine in the direction of arrow 140 by feeding roll 138 in cooperation with spring or weight loaded press roll 141.

The variable speed output shaft 129 of the transmission 127 is connected to jackshaft 143 by coupling 142 and drives the lower knife shaft 149 by means of sprocket 144, chain 145, sprocket 146, gears 147 and 148.

Keyed to lower knife shaft 149 is knife carrier 150 with knife 151. Gear 148 drives gear 153 keyed to the upper knife shaft 152 which has keyed to it knife carrier 154 with knife 155. Lower knife shaft 149 has keyed onto it cam drum 156. A rocker arm 158 pivots on shaft 160 which is journaled at 161 in frame member 119' and at 162 in frame member 118'. Rocker arm 158 carries at its forked upper end roller 157, which is kept in continuous contact with cam drum 156 through the action of stubshaft 128 and spring 131.

Rocker arm 158 is also axially slidable on shaft 160 which it oscillates by means of key 163. Arm 158 can be moved axially by means of shifter fork 164 which engages with groove 159 in the hub of arm 158. Shifter fork 164 has a hub 165 which forms the nut for a shifting screw 166, journaled in frame 119' at 167 and in frame 118' in 168. Handwheel 169 operates screw 166.

The rocking motion of arm 158 is transmitted to stubshaft 128 as follows: Lever 170 is keyed to rocker shaft 160 and is connected to lever 176 by means of pin 171, turnbuckle 172, 173, 174 and pin 175. Lever 176 is keyed to shaft 177, which is journaled in frame 118' at 178 and in frame 119' by means of bracket 179. Lever 130, which actuates stubshaft 128 is also keyed to shaft 177.

The various profiles of cam drum 156 correspond to those disclosed in the previously described embodiments of my invention, profile 156' corresponding to that of Figure 8, while profile 156'' corresponds to that of Figure 10.

The mean radii of the various cams are again proportional to the various cut-off lengths of the material, since the angular velocities of shaft 149 for each point of cam contact with roller 157 are inversely proportional the contact radius of the cam. Each position of rocker arm 158 produces a definite output speed of the variable speed unit 127 and since, as pointed out before, this speed variation is in direct proportion to the movement of stubshaft 128, the output speed of unit 127 and with it the knife shaft speed therefore varies in inverse ratio to the contact radius of roller 157 with cam 156. The cut-off length is therefore definitely controlled by the axial location of rocker arm 158. Any desired length of cut-off within certain limits can be accurately regulated and definitely maintained without variation. The cut-off length adjustment can be made with the mechanism in operation at any desired speed or at rest since the hydraulic unit can be regulated equally well at rest as in motion.

To compensate for possible slight velocity variations between the knives 151 and 155 when in cutting position and the material 140, owing to slipping between the feeding rolls 138 and 141, the relative knife and feeding speeds can be readily adjusted by changing the relative positions of rocker arm 158 and stubshaft 128 by means of turnbuckle 172, 173, 174. If the knives move too fast during their cutting engagement, the distance between 171 and 175 is lengthened by means of the turnbuckle. This moves lever 130 and stubshaft 128 to the right, thereby reducing the output speed of the transmission and with it the knife speed. Since this speed reduction affects the entire cycle, the cut-off length has been increased, because the feeding velocity of the material remained unchanged. The cut-off length must therefore be shortened again by shifting rocking lever 158 to the right. This secondary adjustment has no effect upon the corrected knife velocity at the cut-off period. This velocity adjustment can, of course, be made while the machine is running or standing.

The last described embodiment of my invention also illustrates a special arrangement to compensate the considerable acceleration and deceleration forces which are present with revolving shafts of variable angular velocity, and which otherwise require additional driving power during the acceleration period and braking means during the deceleration period.

This arrangement consists in storing the inertia torque of the mechanism during the deceleration period so as to have it available during the acceleration period. The mechanism subsequently described is, of course, equally applicable to the other disclosed embodiments of my invention.

Upper knife shaft 152 has an eccentric or crank portion 178 located between frames 121' and 120'. This eccentric portion 178 actuates connecting rod 179, which engages at its upper end with rocker arm 180, which has its fulcrum at 181 in a bracket 182 located on frame 121'. Rocker arm extension 183 rests on spring fulcrum 184, holding compression spring 185 at its upper end while spring fulcrum 186 holds it at the lower end. Fulcrum 186 rests on thrust plate 187, which can be moved up and down by adjusting screw 188 through hand wheel 189, which turns nut 190 mounted in frame 121'. The tension of spring 185 can be adjusted with handwheel 189 either manually or automatically in time with the axial adjustment of rocker arm 158.

In the position of eccentric 178 shown in Figures 12, 13 and 14, spring 185 is at minimum compression, and knives 151 and 155 are then in cutting engagement at maximum angular velocity. As knife shaft 152 continues to revolve in the direction of the arrow, its angular velocity decreases, with a resultant deceleration force. This deceleration force or torque is counteracted by the force necessary to compress spring 185, which is thereby storing up or accumulating potential energy until connecting rod has reached its top position, when the knife shaft reaches its lowest angular velocity. As the knife shaft continues to turn, it has to be accelerated again and this acceleration is now assisted by stored energy from the previously compressed spring 185, which now exerts a torque on the knife shafts in the direction of the drive.

Figure 15:
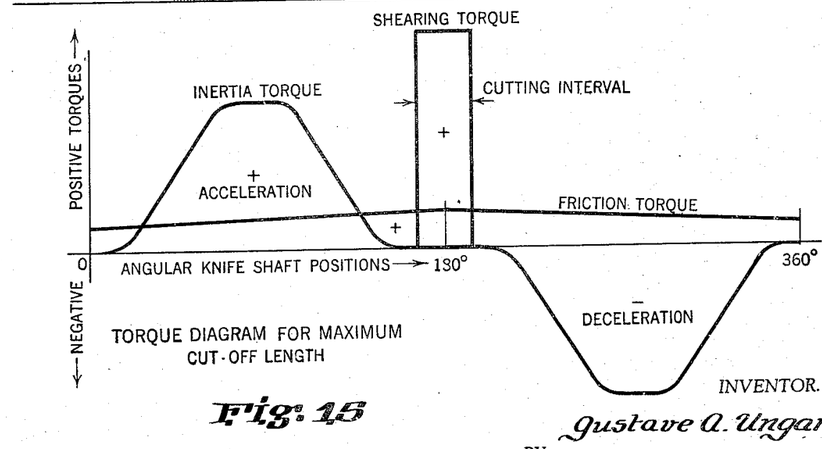
Figure 15 is a graphic illustration of the torques of the revolving cutting elements for maximum sheet length during one revolution or cycle.

Figure 15 shows a torque diagram for the maximum cut-off length, plotted against the angular positions of the knife shaft over 360°. As positive torques are plotted the friction torques of the machine, which increase slightly with increasing angular knife shaft velocities, and the shearing or cutting torque which is only required during the cutting period. The deceleration torque is plotted in negative direction and it becomes practically fully available as positive torque for acceleration. It is, therefore, quite evident that the arrangement of this torque accumulator eliminates the necessity of using braking means to take care of deceleration forces and at the same time greatly reduces or entirely eliminates power consumption otherwise required for acceleration.

By substituting a cam and follower mechanism for the eccentric 178 and connecting rod 179 it is possible to modify the character of the inertia torque curve so as to obtain the most satisfactory acceleration and deceleration conditions of the knife shafts, by employing an appropriate cam profile. Since acceleration and deceleration forces decrease with decreasing cut-off lengths, the required tension of spring 185 will also be less. The adjustment of this spring tension for different cut-off lengths as above described can be either manually by handwheel 184 or by adjusting means interlocked with the mechanism for regulating the cut-off length. The tension of spring 185 can also be changed with variations in the speed of the main power source 122, so as to vary the rate of feed and therefore output of the machine. The inertia torque to be stored during deceleration and made available for acceleration changes with the square of the operating speed of the machine, and the tension of the torque accumulator spring 185 to take care of this can either be manually by handwheel 189 or automatically by suitably linking the spring compression means to the speed controlling means of power source 122.

It is also apparent that the torque accumulating mechanism may employ other elastic means in place of the coil spring 185 which is illustrated. Such other elastic means may be rubber blocks or compressed air cushions, with and without the intermediate insertion of a hydraulic column.

Although I have described preferred illustrations of my invention, I do not intend to be limited thereby except as set forth in the appended claims.

I claim:

1. In a device for cutting strip material in predetermined lengths; cutting mechanism operable in cycles; power means for feeding said strip material at a constant speed past said cutting mechanism; a timing element having a variable contour from one end thereof to the other; a common means coacting with the several parts of said variable contour for selectively controlling the period of an associated cycle of the cutting mechanism and also controlling the rate of rotation of said cutting mechanism during cutting.

2. In a device for cutting strip material in predetermined lengths; cutting mechanism operable in cycles; power means for feeding said strip material at a constant speed past said cutting mechanism; a timing element comprising a cam-element having increased camming effect from one end to the other, said cam element controlling the period of a cycle of the cutting mechanism and also controlling the rate of rotation of said cutting mechanism during cutting.

3. In a device for cutting strip material in predetermined lengths; cutting mechanism operable in cycles; power means for feeding said strip material at a constant speed past said cutting mechanism; a Reeves drive for driving said cutting mechanism; a timing element having a plurality of timing sections; a common means cooperating with each section independently controlling the operation of said Reeves drive for controlling the period of a cycle of the cutting mechanism and also controlling the rate of rotation of said cutting mechanism during cutting.

4. In a device for cutting strip material in predetermined lengths; cutting mechanism operable in cycles; power means for feeding said strip material at a constant speed past said cutting mechanism and for driving said cutting mechanism; and timing means directly operable on said power means, means cooperating with said timing means for varying the cycle in which said power means drives said cutting mechanism and invariably driving said cutting mechanism at the speed of said strip material during cutting.

5. In a device for cutting strip material in predetermined lengths; cutting mechanism operable in cycles; power means for feeding said strip material at constant speed past said cutting mechanism; a driving connection from said power means to said cutting mechanism; and a velocity controlling means exterior of said driving connection for selectively controlling the velocity at which said driving connection drives said cutting mechanism throughout the cycle.

6. In a device for cutting strip material in predetermined lengths; cutting mechanism operable in cycles; power means for feeding said strip material at constant speed past said cutting mechanism; a driving connection from said power means to said cutting mechanism; and a velocity controlling means exterior of said driving connection for selectively varying the period of the cycle at which said driving connection drives said cutting mechanism and for causing said driving power to drive said cutting mechanism in synchronous speed with said strip material during the cutting interval.

7. In a device for cutting strip material in predetermined lengths; cutting mechanism operable in cycles; power means for feeding said strip material at constant speed past said cutting mechanism; a driving connection from said power means to said cutting mechanism; and a velocity controlling means exterior of said driving connection for selectively controlling the velocity at each instant in a cycle at which said driving connection drives said cutting mechanism throughout the cycle.

8. In a device for cutting strip material in predetermined lengths; cutting mechanism operable in cycles; power means for feeding said strip material at constant speed past said cutting mechanism; a driving connection from said power means to said cutting mechanism; and a timing means exterior of said driving connection for selectively varying the rate at every instant of the period of the cycle at which said driving connection drives said cutting mechanism and for causing said driving power to drive said cutting mechanism in synchronous speed with said strip material during the cutting interval.

9. In a device for cutting strip material in predetermined lengths; cutting mechanism operable in cycles; power means for feeding said strip material at a constant speed past said cutting mechanism; a driving connection from said power means to said cutting mechanism; and a timing means comprising a cam mechanism having a surface varying in contour continuously from one end to the other; a cam follower; means for selectively bringing said cam follower in operative relation with one of said contours and a connection from said cam follower to said driving connection for controlling the rate at which said driving connection drives said cutting mechanism.

10. In a device for cutting strip material in predetermined lengths; cutting mechanism operable in cycles; power means for feeding said strip material at a constant speed past said cutting mechanism; and a constant speed drive connection from said power means to said cutting mechanism comprising solely circular driving connections and means for varying the time cycle at which said cutting mechanism is operated from said source of power while maintaining said constant speed and for maintaining said cutting mechanism in synchronism with said strip material during the cutting period.

11. In a device for cutting strip material in predetermined lengths; cutting mechanism operable in cycles; power means for feeding said strip material at a constant speed past said cutting mechanism; a driving connection and timing mechanism for said cutting mechanism comprising a hydraulic transmission unit for driving said cutting mechanism in synchronism with said strip material.

12. In a device for cutting strip material in predetermined lengths; cutting mechanism operable in cycles; power means for feeding said strip material at a constant speed past said cutting mechanism; a continuously operating positive driving connection from said power means to said cutting mechanism; and a velocity controlling means exterior of said driving connection for selectively controlling the velocity at which said driving connection drives said cutting mechanism throughout the cycle.

13. In a device for cutting strip material in predetermined lengths; cutting mechanism operable in cycles; power means for feeding said strip material at constant speed past said cutting mechanism; a driving connection from said power means to said cutting mechanism; and a timing means exterior of said driving connection for varying the period of the cycle at which said driving connection drives said cutting mechanism and for causing said driving power to drive said cutting mechanism in synchronous speed with said strip material during the cutting interval; and means for compensating for any tendency to a slight difference between the speed of the cutting mechanism and strip material at the period of cutting.

14. In a device for cutting strip material in predetermined lengths; cutting mechanism operable in cycles; power means for feeding said strip material at a constant speed past said cutting mechanism; means for increasing the speed of the cutting mechanism to the speed of the strip material for cutting operation; means for decreasing the speed of the cutting mechanism in accordance with a desired time cycle; and means for storing energy during the period of decreasing speed of the cutting mechanism for use during the increasing speed period.

15. In a device for cutting strip material in predetermined lengths; cutting mechanism operable in cycles; power means for feeding said strip material at a constant speed past said cutting mechanism; means for increasing the speed of the cutting mechanism to the speed of the strip material for cutting operation; means for decreasing the speed of the cutting mechanism in accordance with a desired time cycle; means for compensating for slight differences in speed between the cutting mechanism and strip material which tend to occur at the cutting period; and means for storing energy during the period of decreasing speed of the cutting mechanism for use during the increasing speed period.

16. In a device for cutting strip material in predetermined lengths; rotary cutting mechanism operable in cycles; power means for feeding said strip material at constant speed past said rotary cutting mechanism; a driving connection from said power means to said rotary cutting mechanism; and a velocity controlling means exterior of said driving connection for selectively controlling the velocity at which said driving connection drives said rotary cutting mechanism throughout the cycle.

17. In a device for cutting strip material in predetermined lengths; cutting mechanism operable in cycles; power means for feeding said strip material at constant speed past said cutting mechanism; a driving connection from said power means to said cutting mechanism; and a timing means comprising a plurality of elliptical gears; a driving connection from said elliptical gears to said source of power; means for selectively switching said driving connection to any one of said gears for controlling the rate at which said driving connection drives said cutting mechanism.

18. In a device for cutting strip material in predetermined lengths; cutting mechanism operable in cycles; power means for feeding said strip material at a constant speed past said cutting mechanism; a source of power; and a driving connection from said source of power to said cutting mechanism comprising a cam, the contour of the surface of which varies continuously from one end to the other of the cam, and a cam follower cooperating with said contours for driving said cutting mechanism at variable time cycles and instantaneous speeds.

19. In a device for cutting strip material in predetermined lengths, cutting mechanism operable in cycles; power means; a drive connection from said power means to said cutting mechanism; means for feeding said strip material past said cutting mechanism at a constant speed; and means exterior of said drive connection for selectively controlling said drive connection to vary the speed at which said power means drives said cutting mechanism.

20. In a device for cutting strip material in predetermined lengths, cutting mechanism operable in cycles; power means; a drive connection from said power means to said cutting mechanism; means for feeding said strip material past said cutting mechanism at a constant speed; and adjustable means exterior of said drive connection for selectively controlling said drive connection to vary the speed at which said power means drives said cutting mechanism whereby strip material of variable lengths is cut.

21. In a device for cutting strip material in predetermined lengths, cutting mechanism operable in cycles; power means rotating at a relatively constant speed; a drive connection from said power means to said cutting mechanism; means for feeding said strip material past said cutting mechanism at a constant speed; and adjustable means exterior of said drive connection for selectively controlling said drive connection to vary the speed at which said power means drives said cutting mechanism whereby strip material of variable lengths is cut.

22. In a device for cutting strip material in predetermined lengths, cutting mechanism operable in cycles; power means operating at substantially constant speed; a drive connection from said power means to said cutting mechanism; and means for selectively varying the speed at which said cutting mechanism is driven by said power means while permitting said power means to remain operating at said substantially constant speed.

GUSTAVE A. UNGAR.